United States Patent [19]
Hastings et al.

[11] Patent Number: 6,066,943
[45] Date of Patent: May 23, 2000

[54] CAPACITIVE-SUMMING SWITCH-MODE POWER CONVERSION CONTROL

[75] Inventors: Roy A. Hastings, Allen; Marwan M. Hassoun, Austin; Neil Gibson, Richardson; Marco Corsi, Dallas, all of Tex.

[73] Assignee: Texas Instruments Incorporated, Dallas, Tex.

[21] Appl. No.: 09/168,838

[22] Filed: Oct. 8, 1998

[51] Int. Cl.[7] .................................................. G05F 1/565
[52] U.S. Cl. ............................................ 323/285; 323/288
[58] Field of Search ..................................... 323/282, 284, 323/285, 288, 299

[56] References Cited

U.S. PATENT DOCUMENTS

| | | | |
|---|---|---|---|
| 5,436,550 | 7/1995 | Arakawa | 323/288 |
| 5,600,234 | 2/1997 | Hastings et al. | 323/285 |
| 5,689,176 | 11/1997 | Deloy | 323/288 |

*Primary Examiner*—Jeffrey Sterrett
*Attorney, Agent, or Firm*—Ronald O. Neerings; Wade James Brady, III; Frederick J. Telecky, Jr.

[57] ABSTRACT

A controller for a power converter wherein there is provided a comparator having an output terminal and first and second input terminals. A switch-mode power train is coupled to the output terminal and operable to receive an unregulated input voltage and provide a regulated output voltage. A feedback network coupled to the switch-mode power train provides a voltage to the first input of the comparator. A ramp circuit includes a first capacitor divider having a first capacitor connected from a first input node to a first midpoint node and a second capacitor connected from the first midpoint node to a first reference voltage node and a second capacitor divider including a third capacitor connected from a second input node to a second midpoint node and a fourth capacitor connected from the second midpoint node to the first reference node. A first switch couples the first or second midpoint node to the second input of said comparator. A second switch couples a current source to the first input node when the first switch connects the first midpoint node to the comparator or to the second input node when the first switch connects the second midpoint node to the comparator. A third switch couples the first input node to the reference voltage node when the second switch couples the current source to the second input node. A fourth switch couples the second input node to the first reference voltage node when the second switch couples the current source to the first input node. A fifth switch couples the first midpoint node to the second reference voltage node when the second switch couples the current source to the second input node and a sixth switch couples the second midpoint node to the second reference voltage node when the second switch couples the current source to the first input node.

14 Claims, 4 Drawing Sheets

CAPACITIVE-SUMMING SWITCH-MODE POWER CONVERSION CONTROL

BACKGROUND OF THE INVENTION

1. Field of the Invention

This invention relates to a controller for a switch-mode power converter and the control method therefor.

2. Brief Description of the Prior Art

A switch-mode power converter is a multiport system which receives electrical energy at an input port and transforms this energy using a network of switches and reactive elements (the power train) to supply electrical energy at desirable voltage levels to one or more output ports. A feedback control system is connected between one of the output ports (the controlled output) and one or more switches in the power train. This feedback system senses the voltage (and possibly the current) at the controlled output port and adjusts the duty cycle (and possibly the period) of the switches in the power train to maintain the desired conditions at the controlled output port. The remaining output ports, if any, are slaved to the controlled port and generate voltages or currents in definite ratio to the controlled port.

The simplest class of converters (canonical converters) has one input and one output port and utilizes a power train having one inductor, one capacitor and two switches, one of the switches being customarily implemented using a diode. The three canonical converters are the buck converter, which generates an output voltage lower than the input voltage, the boost converter, which generates an output voltage higher than the input voltage and the buck-boost converter, which generates an inverted polarity voltage whose magnitude may be greater than, less than or equal to the input voltage.

Prior art converters have used numerous methods to control the switches to regulate the flow of energy through the power train. Since most switch-mode power supplies are designed to provide definite output voltages, the output voltage at the controlled port is almost always a controlled variable. Control schemes have been developed which also include output current, inductor current, switch current, input voltage, etc. as control variables. Most control methods require the addition of lead-lag compensation networks to adjust the phase shift around the feedback loop to ensure stability. Most implementations of these control methods include one or more operational amplifiers to provide gain and to allow convenient implementation of the lead-lag networks. The presence of operational amplifiers in the feedback path is undesirable from for at least two reasons, these being (1) that these amplifiers require considerable supply current to operate, which may degrade the efficiency of low-power converters, and (2) the amplifiers always inject some additional (and undesirable) phase shift at higher frequencies, making it necessary to apply more complicated lead-lag compensation networks than might otherwise be necessary.

Voltage-mode control schemes normally require a ramp generator, a comparator and an operational amplifier. The ramp generator produces a sawtooth or triangle voltage waveform having a convenient amplitude, for example, one volt. The operational amplifier compares the output voltage of the converter against a reference voltage and generates an error signal proportional to the difference between the output voltage and the reference voltage. The comparator then compares the output of the amplifier to the ramp. Whenever the error signal is larger than the ramp, the comparative activates switches in the power train which increase the current flowing through the converter. Whenever the error signal is smaller than the ramp, the comparator deactivates the switches and allows the current flowing through the converter to decrease. The comparator and ramp generator together comprise the pulse-width modulator (PWM) circuit used to transform the error voltage into a digital control signal used to drive the switches.

A prior art control scheme known as direct-summing voltage-mode control eliminates the need for the operational amplifier and its associated lead-lag compensation network by using a ramp having a very small magnitude, for example, 50 to 100 mV. Because of the small magnitude of the ramp, the circuit no longer requires large amounts of amplification. If the operational amplifier is removed, the gain of the resulting circuit will still be adequate to maintain acceptable line and load regulation. Since the amplifier no longer contributes excess phase, the power train of the buck controller now behaves as a two-pole system. A zero can be introduced into the transfer function of the control loop by placing a small resistance in series with the output filter capacitor. By this means, the circuit can be stabilized without requiring a lead-lag network. A similar stabilization scheme can also be used for boost and buck-boost controllers as long as the currents through the converter do not exceed several hundred milliamperes. At higher currents, the right-half-plane zero caused by the interruption of output current flow by the switch moves to sufficiently low frequencies to require a dominant-pole compensation network.

Prior art direct-summing voltage-mode controllers have several disadvantages. First, it is difficult to derive a low-amplitude ramp having the necessary fidelity. Noise coupling from the power train can cause glitches which interfere with the proper operation of the pulse-width modulator. Higher gains require smaller signals which are even more nose-sensitive. Second, the ramp voltage waveform used in a direct-summing controller must include a small ramp voltage imposed on a larger fixed offset voltage. For example, the ramp may consist of a 50 mV sawtooth waveform imposed on a 1 volt DC offset. Although it is possible to generate a waveform of this type using capacitive coupling between a low-amplitude sawtooth ramp generator and a resistive bias network, the impedance of the biasing network renders this solution extremely vulnerable to noise coupling. The conventional solution has been the substitution of a summing comparator for the single-input-port comparators used in conventional PWM modulators. A simple summing comparator has two input ports and asserts its output if and only if the sum of the differential voltages across both input ports exceeds zero. The use of multiple input ports eliminates the need for a DC offset on the ramp waveform. Unfortunately, the summing comparator generally requires several times more current than a conventional single-input-port comparator and has propagation delays which are several times as long as those of the single-input-port comparator. As a result, summing comparators make it difficult to construct high-speed low-overhead-current control circuits of the sort required for many modern portable electronic devices.

SUMMARY OF THE INVENTION

The present invention provides a method of eliminating the summing amplifier conventionally used in direct-summing voltage-mode control systems. The invention allows the summing of an arbitrary number of signals by use of a capacitive divider which may simultaneously form part of the ramp generator. This technique has numerous advantages. First, it allows the summing comparator to be replaced by a conventional single-input-port comparator which requires several times less current and has a much smaller propagation delay than found in the above described prior art. Second, the invention eliminates the necessity of using bipolar transistors which are required to construct most types of summing amplifiers. This, in turn, allows the implementation of the pulse-width-modulator using a simple CMOS process. The elimination of bipolar transistors potentially results in significant cost savings for mass-market applications. Third, the capacitive summing technique requires no additional components, as it uses components which already form part of the ramp generator. Fourth, since no additional circuitry is required, no additional current is drawn by the capacitive summer. Fifth, the capacitive summing technique inherently generates a very small ramp voltage which is coupled to ground through a relatively large capacitor. The presence of this capacitor greatly reduces the sensitivity of the ramp signal to external noise injection and allows the generation of very small ramp signals.

Although the present invention may appear to fill much the same role as a coupling capacitor in combination with a resistive biasing network, the present invention offers substantially improved performance. The elimination of the resistor divider also eliminates the currents which necessarily flow through this divider. Since these currents must be relatively large in order to obtain a low impedance at the output of the ramp generator, this advantage is much more significant than it may at first appear. The capacitive summing technique also allows the summing circuitry to form part of the ramp generator and eliminates the need for a buffer amplifier or voltage follower stage between the ramp generator and the summing circuitry. Since buffer amplifiers and voltage followers require operating current, generally in relatively large amounts, the present invention again provides a lower-current method of generating the required signals.

The capacitive summing technique can be extended to encompass a large variety of control methods, including not only voltage-mode control, but also current-mode control and various other dual-control-loop techniques, including the one set forth in U.S. Pat. No. 5,600,234 and any of numerous techniques currently in use for power factor correction.

DESCRIPTION OF THE PREFERRED EMBODIMENT

Figure 1:
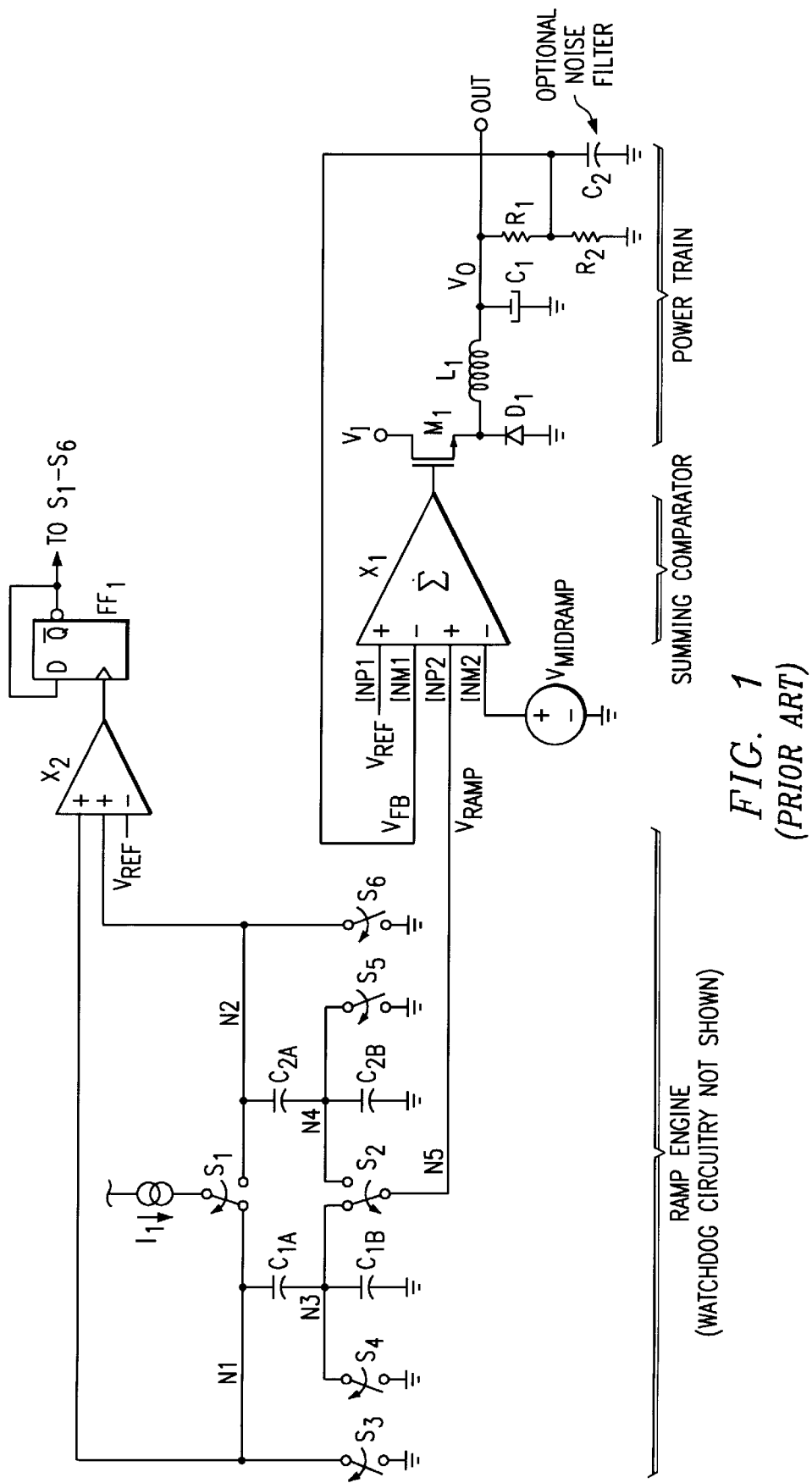
FIG. 1, is a circuit diagram of a prior art direct-summing voltage-mode converter.

FIG. 1 shows a prior art direct-summing voltage-mode converter circuit which includes a ramp generator (ramp engine), a summing comparator, a power train and a feedback divider. The ramp generator includes two capacitor dividers, the first divider comprising capacitor C1A connected between nodes N1 and N3 and capacitor C1B connected between node N3 and ground, and the second divider comprising capacitor C2A connected between nodes N2 and N4 and capacitor C2B connected between node N4 and ground. Switch S1 alternately connects current source I1 to nodes N1 and N2.

Nodes N1 and N2 connect to the noninverting inputs (+) of a three-input comparator X2. The output of comparator X2 is high if and only if the voltage on at least one of the two noninverting inputs exceeds the voltage on its inverting input (−). The inverting input (−) of comparator X2 connects to a fixed reference voltage Vref.

The ramp generator includes five additional switches S2 to S6. Switch S2 connects either node N3 or node N4 to node N5, which forms the output of the ramp generator. Switch S3 short circuits node N1 to ground when closed. Switch S4 short circuits node N3 to ground when closed. Switch S5 short circuits node N4 to ground when closed. Switch S6 short circuits node N2 to ground when closed.

Initially, for example (it being understood that the starting state is arbitrarily chosen), switch S1 connects current source I1 to node N1, switch S2 connects node N3 to node N5, switches S3 and S4 are open, switch S5 connects node N4 to ground and switch S6 connects node N2 to ground. Current from current source I1 flows into the capacitive divider comprised of capacitors C1A and C1B. The voltage on node N1 increases at a constant rate until it exceeds fixed reference voltage Vref, at which time the voltage at the output of the three input comparator X2 transitions from low to high and clocks flip-flop FF1. The output of flip-flop FF1 toggles in response to this stimulus. Switches S1 to S6 are controlled by the output of flip-flop FF1, so their states now change as follows: switch S1 connects current source I1 to node N2, switch S2 switches to connect node N4 to node N5, switch S3 closes and short circuits node N1 to ground, switch S4 closes and short circuits node N3 to ground and switches S5 and S6 open. The voltage on node N1 now rapidly collapses to zero, while the voltage on node N2 begins to increase at a constant rate. When the voltage on node N2 exceeds constant reference voltage Vref, comparator X2 again toggles flip-flop FF1 and the cycle repeats.

As the result of the operation of comparator X2 and flip-flop FF2, the voltage on node N5 becomes a sawtooth ramp. In order to ensure that the periods of the ramp controlled by capacitors C1A/C1B and C2A/C2B are equal, capacitor C1A must equal in value capacitor C2A and capacitor C1B must equal in value capacitor C2B. The magnitude of the sawtooth ramp waveform will equal:

$$\text{Vramp (max)}=Vref*C1A/(C1A+C1B)$$

The voltage Vramp on node N5 is fed to the inverting input (+) of the second of two ports of summing comparator X1. The output of summing comparator X1 will be high if and only if the following inequality is true:

$$(INP1-INM1)+k*(INP2-INM2)>0$$

where INM1 and INP1 are the inverting and noninverting inputs of the first port of summing comparator X1, INM2 and INP2 are the inverting and noninverting inputs of the second port of the summing comparator X1 and k is a dimensionless constant which represents the cross-port gain of the summing comparator X1. For purposes of argument, assume k=1. The voltage Vramp on node N5 is coupled to the noninverting input of the second port, while a fixed voltage Vmidramp is applied to the inverting input (−) of the same port. A resistor divider comprising resistors R1 and R2 is connected to receive the output voltage Vo generated by the converter and to provide a voltage Vfb to the inverting input (−) of the first port of the summing comparator X1. The noninverting input (+) of the first port of the summing comparator X1 connects to fixed reference voltage Vref. The output of summing comparator X1 goes high when the following inequality is true:

$$(Vref-(Vo*R2)/(R1+R2))+k*(C1A/(C1A+C1B)*VN1-Vmidramp)>0$$

if switch S1 connects current source I1 to node N1, or $$(Vref-(Vo*R2)/(R1+R2))+k*(C2A/(C2A+C2B)*VN2-Vmidramp)>0$$

if switch S1 connects current source I1 to node N2. The values of k, C1A, C2A, C1B and C2B determine the effective gain of the converter loop and are chosen to achieve reasonable line and load regulation while maintaining loop stability.

The output of summing comparator X1 drives the power train of the converter which comprises transistor M1, diode D1, inductor L1 and capacitor C1, which together comprise a buck converter capable of receiving an input voltage Vi and generating an output voltage Vo such that Vo<Vi. The rate of energy transfer through the converter is controlled by the duty cycle of the signal generated by summing comparator X1. This is, in turn, controlled by the relative magnitudes of the feedback voltage Vfb, the reference voltage Vref, the ramp voltage Vramp and the midramp voltage Vmidramp. Vmidramp is not necessarily set to the midpoint of the ramp voltage. Rather, Vmidramp is set to whatever voltage is required to provide the desired equilibrium output voltage.

If desired, an optional noise filtering capacitor C2 can be added to minimize the sensitivity of the circuit to noise coupled from the power train into the summing comparator. The ramp generator also customarily includes a startup circuit designed to ensure that the ramp generator does not remain in a state where the output of comparator X2 becomes stuck in the high state as is well known and included herein by reference.

Figure 2:
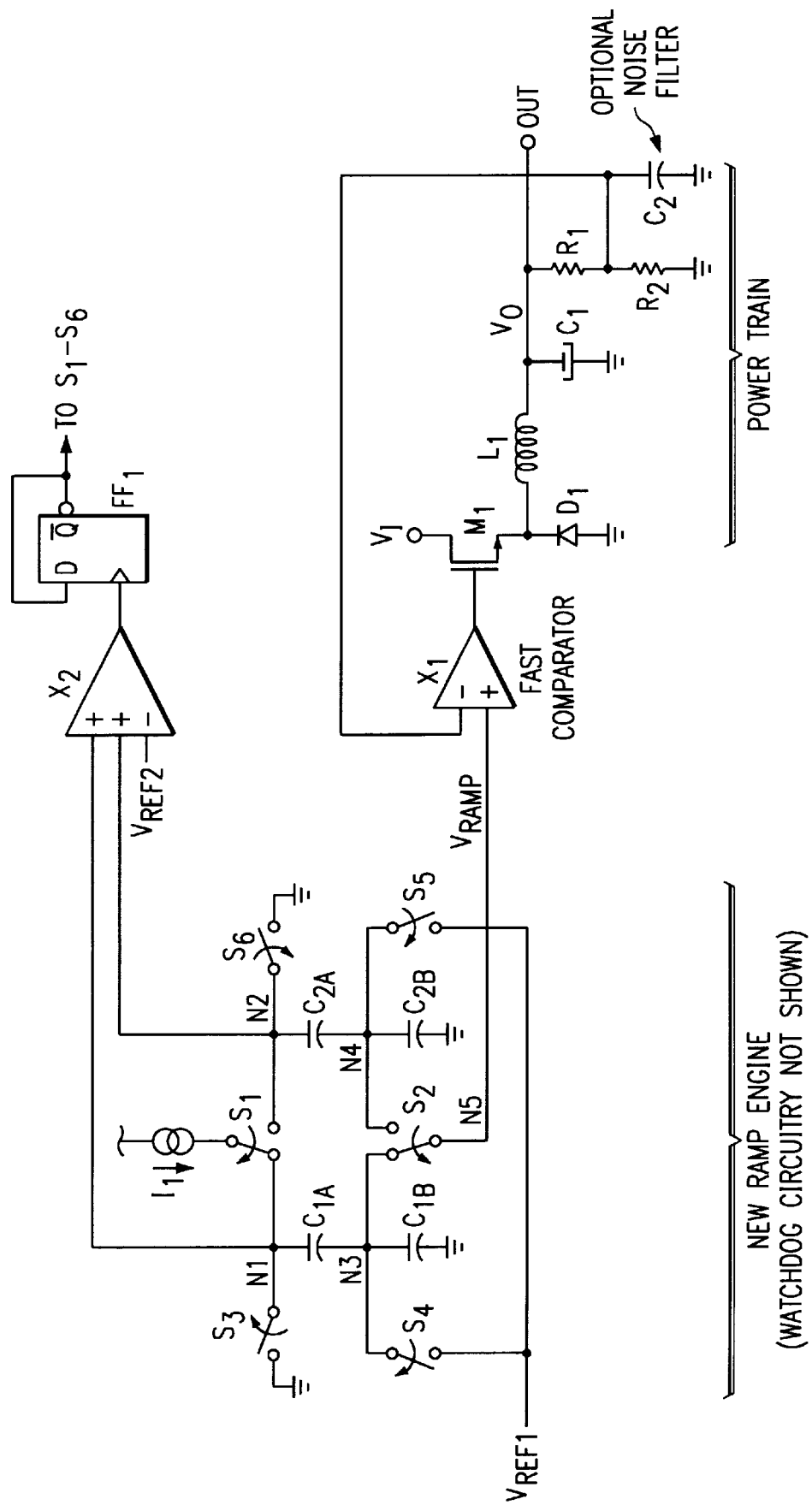
FIG. 2 is a circuit diagram showing a capacitive summing voltage-mode converter having a reference voltage fed ramp engine for a converter in accordance with the present invention.

FIG. 2 shows a capacitive-summing voltage-mode converter constructed according to the present invention. The circuit includes a ramp generator, a fast single input port comparator, a power train and a feedback divider. The fast comparator replaces the summing comparator of the prior art design, producing a number of advantages discussed hereinbelow. This substitution is made possible by modifications to the ramp generator circuit relative to the prior art as described in connection with FIG. 1. The modified ramp generator comprises two capacitive dividers, the first divider comprising a capacitor C1A connected between nodes N1 and N3 and capacitor C1B connected between node N3 and ground, and the second divider comprising a capacitor C2A connected between noses N2 and N4 and capacitor C2B connected between node N4 and ground. Switch S1 alternately connects current source I1 to nodes N1 and N2. Capacitors C1A and C2A each have substantially the same value and capacitors C1B and C2B each have substantially the same value. The ratio of the values of capacitors C1A and C2A to capacitors C1B and C2B can be as large as about 100:1 and is typically about 10:1.

Nodes N1 and N2 connect to the noninverting inputs of a three-input comparator X2 whose inverting input connects to a fixed reference voltage Vref2. The output of comparator X2 connects to the clock input of flip-flop FF1 whose output determines the states of switches S1 to S6. Switch S2 connects either node N3 or node N4 to node N5, which forms the output of the ramp generator. Switch S3 connects node N1 to ground when closed. Switch S4 connects node N3 to fixed reference voltage Vref1 when closed. Switch S5 connects node N4 to Vref1 when closed. Switch S6 connects node N2 to ground when closed. The difference between the invention and the prior art circuit relates to the connection of switches S4 and S5 to Vref1, which, as will be shown hereinbelow, allows for the elimination of the summing comparator. It should be understood that Vref1 and Vref2 need not be but can be the same voltage.

Initially, switch S1 connects current source I1 to node N1, switch S2 connects node N3 to node N5, switches S3 and S4 are open, switch S5 connects node N4 to Vref1 and switch S6 connects node N2 to ground. Current flows from current source I1 into the capacitive divider comprised of capacitors C1A and C2B. The voltage on node N1 increases at a constant rate until it exceeds fixed reference voltage Vref2, at which time the voltage at the output of the three-input comparator X2 transitions from low to high and clocks flip-flop FF1. The output of flip-flop FF1 toggles in response to this stimulus. Switches S1 to S6 are controlled by the output of flip flop FF1 and respond as follows: switch S1 connects current source I1 to node N2, switch S2 connects node N4 to node N5, switch S3 closes and connects node N1 to ground, switch S4 closes and connects node N3 to Vref1 and switches S5 and S6 open. The voltage on node N1 now rapidly collapses to zero, while the voltage on node N2 begins to increase at a constant rate. Since switch S4 connects node N3 to Vref1, this node will come to rest at a potential equal to Vref1. Very little current actually flows through switch S4, since capacitors C1A and C2A do not allow constant current to flow into node N3. Switch S4 therefore serves only to establish the DC operating point from which node N3 will begin rising upon the next operating cycle of the ramp generator. In response to the new positions of switches, the voltage on node N2 begins to rise at a constant rate. The voltage on node N4 also rises, although at a much slower rate controlled by the values of capacitors C2A and C2B in accordance with:

$$dV(N4)/dt=C2A/(C2A+C2B)*dV/(N2)/dt$$

The initial voltage on node N4 equals Vref1, as switch S5 connected this node to Vref1 during the prior phase of operation. When the voltage on node N2 exceeds constant reference voltage Vref2, comparator X2 again toggles flip-flop FF1 and the cycle repeats.

As the result of the operation of comparator X2 and flip-flop FF2, the voltage on node N5 becomes a sawtooth ramp. In order to ensure that the periods of the ramp controlled by capacitors C1A/C1B and C2A/C2B are equal, C1A must equal C2A and C1B must equal C2B. The magnitude of the sawtooth ramp waveform will equal:

Vramp(min)=Vref1

Vramp(max)=Vref1+Vref2*(C1A/(C1A+C2A)),

Vramp=Vref1+C1A/(C1A+C1B)*VN1 if S1 connects I1 to N1,

Vramp=Vref1+C2A/(C2A+C2B)*VN2 if S1 connects I1 to N2.

As can be seen from the above equations, the ramp waveform generated by the invention has the same peak-to-peak voltage as the ramp waveform generated by the prior art circuit. However, the ramp waveform now has a constant offset voltage equal to Vref1 as a consequence of the connection of switches S4 and S5.

This ramp waveform is coupled to the noninverting input of a fast comparator X1, while the feedback voltage Vfb generated by the resistor divider comprised of resistors R1 and R2 is coupled to the inverting input of comparator X1. The output of comparator X1 will go high when the following inequality is true:

$Vramp > Vfb$ which is equal to $Vref1 + C1A/(C1A+C1B)*VN1 - Vo*R2/(R1+R2) > 0$ if $S1$ connects $I1$ to $N1$, or $Vref1 + C2A/(C2A+C2B)*VN2 - Vo*R2/(R1+R2) > 0$ if $S1$ connects $I1$ to $N2$.

A comparison of these equations to those given hereinabove for the prior art circuit will shown that both circuits perform essentially the same function. The absence of voltage Vmidramp is noncritical since the values of R1 and R2 can be adjusted to mimic the effect of Vmidramp.

The values of capacitors C1A, C2A, C1B and C2B determine the effective gain of the converter loop and are chosen to achieve reasonable line and load regulation while maintaining loop stability.

The output of comparator X1 drives the power train of the converter, which comprises transistor M1, diode D1, inductor L1 and capacitor C1, which together comprise a buck converter capable of receiving an input voltage Vi and generating an output voltage Vo such that Vo<Vi. The rate of energy transfer through the converter is controlled by the duty cycle of the signal generated by summing amplifier X1. This is in turn controlled by the relative magnitudes of the feedback voltage Vfb, the reference voltage Vref and the ramp voltage Vramp.

If desired, an optional noise filtering capacitor C2 can be added to minimize the sensitivity of the circuit to noise coupled from the power train into the fast comparator. The ramp generator also customarily includes a startup circuit designed to ensure that the ramp generator does not remain in a state where the output of comparator X2 becomes stuck in the high state.

Figure 3:
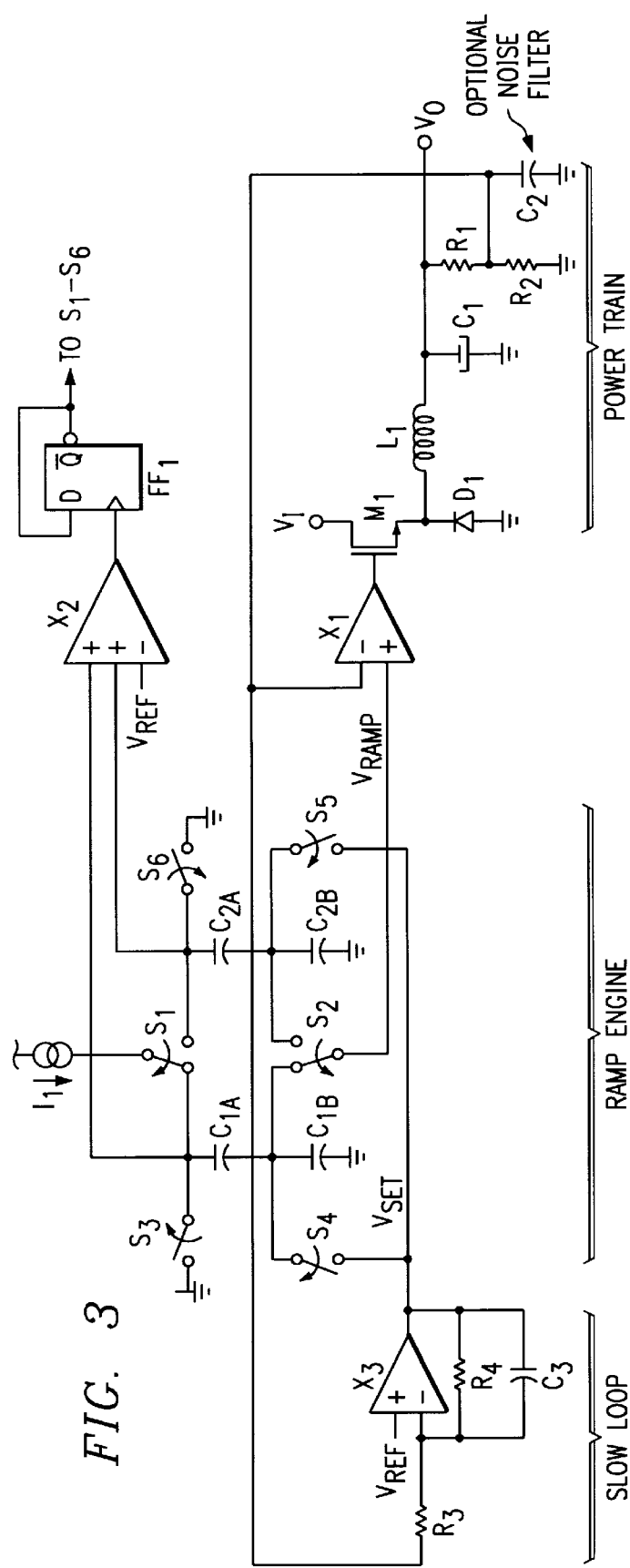
FIG. 3 shows extension of the present invention to the dual-loop topology set forth in U.S. Pat. No. 5,600,234 by feeding the output of the slow loop into switches S3 and S4.

The above described invention can be extended to the dual-loop topology set forth in U.S. Pat. No. 5,600,234 which is incorporated herein by reference by feeding the output of the slow control loop through amplifier X3 into switches S3 and S4 as shown in FIG. 3.

Figure 4:
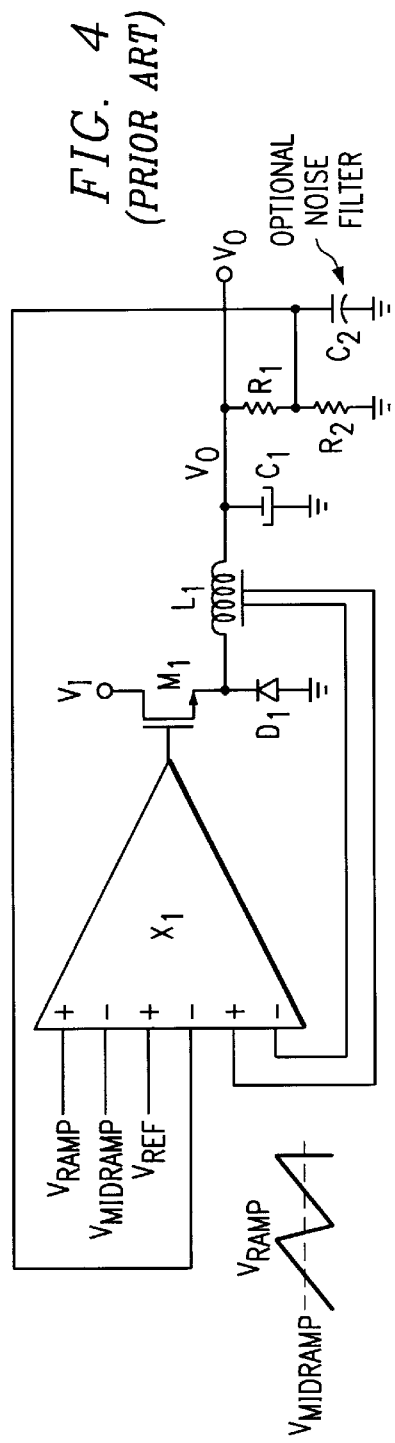
FIG. 4 shows a prior art direct-summing peak-current-commanding current-mode converter.
Figure 5:
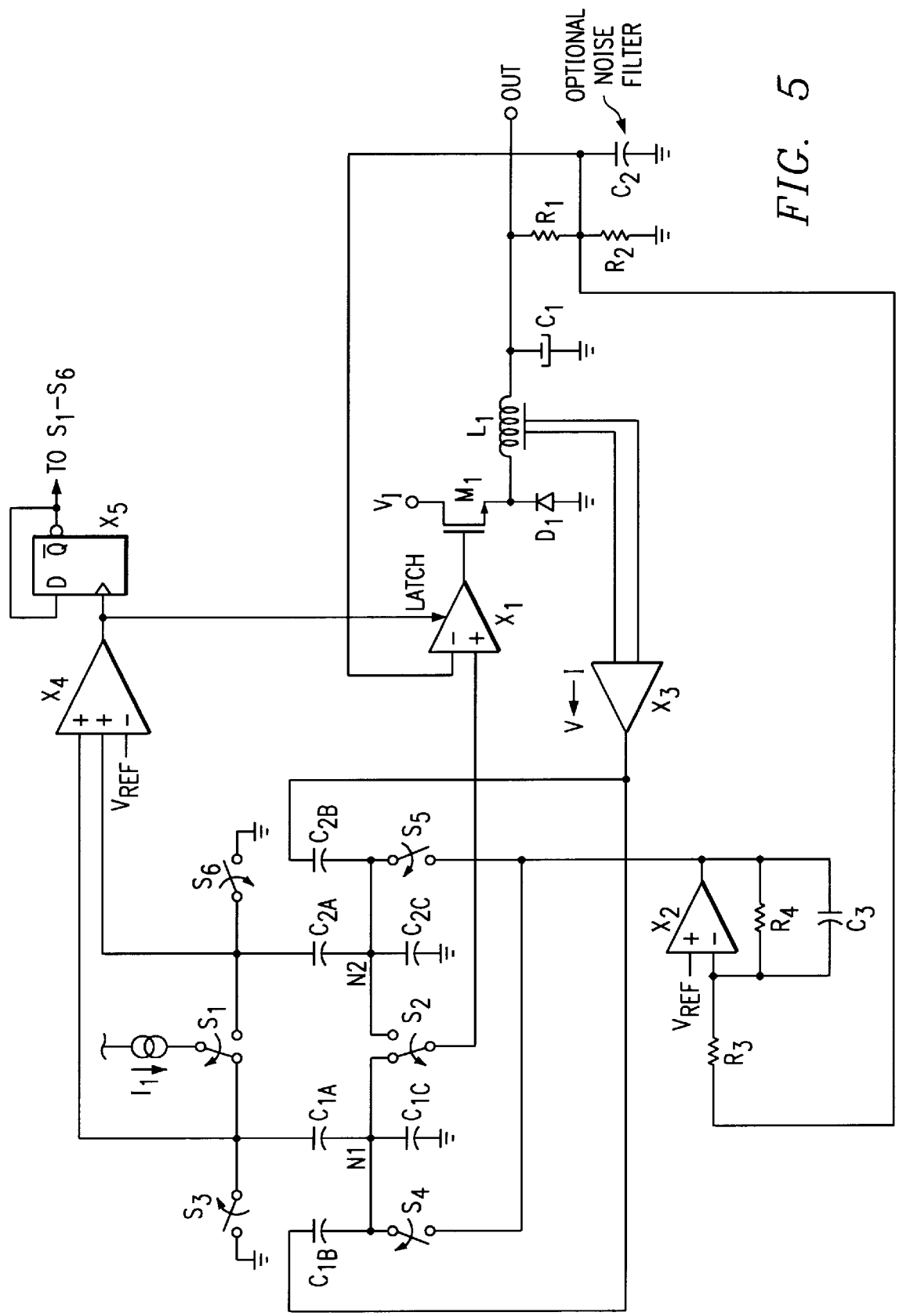
FIG. 5 shows an extension of the present invention to a peak-current-commanding current-mode converter.

The principle of the invention can be extended to converters which contain more than two input pairs in the summing amplifier. Considering the direct summing current mode circuit of FIG. 4, this circuit can be transformed into a new and circuit as shown in FIG. 5. The multiple summing inputs are provided by multiple capacitors feeding charge into a common node which is precharged as discussed above. In this case, capacitors C1A and C1B are used to feed in a ramp waveform which provides slope compensation and capacitors C1B and C2B are used to feed a current analog waveform. These sum at nodes N1 and N2. As before, the new approach speeds up the circuit and saves current by eliminating the summing comparator with the same advantages as stated above.

It should further be noted that, since a current mode converter can use the above described technique, the technique can also be used in conjunction with power factor correctors.

Though the invention has been described with reference to specific preferred embodiments thereof, many variations and modifications will immediately become apparent to those skilled in the art. It is therefore the intention that the appended claims be interpreted as broadly as possible in view of the prior art to include all such variations and modifications.

We claim:

1. A controller for a switch-mode power converter comprising:
    (a) a comparator having an output terminal and first and second input terminals;
    (b) a switch-mode power train coupled to said output terminal and operable to receive an unregulated input voltage and to provide a regulated output voltage;
    (c) a feedback network coupled to receive the regulated output voltage of said switch-mode power train and to provide a voltage to the first input of said comparator; and
    (d) a ramp circuit comprising:
        (i) a first input node, a first midpoint node and a first capacitor divider circuit comprising a first capacitor connected from said first input node to said first midpoint node and a second capacitor connected from said first midpoint node to a first reference voltage;
        (ii) a second input node, a second midpoint node and a second capacitor divider comprising a third capacitor connected from said second input node to said second midpoint node and a fourth capacitor connected from said second midpoint node to said first reference voltage;
        (iii) a first switch selectively coupling one of said first midpoint node or said second midpoint node to said second input of said comparator;
        (iv) a second switch coupling a current source to said first input node when said first switch connects said first midpoint node to said second input of said comparator and coupling said current source to said second input node when said first switch connects said second midpoint node to said second input of said comparator;
        (v) a third switch coupling said first input node to a first reference voltage when said second switch couples said current source to said second input node;
        (vi) a fourth switch coupling said second input node to said first reference voltage when said second switch couples said current source to said first input node;
        (vii) a fifth switch coupling said first midpoint node to a second reference voltage different from said first reference voltage when said second switch couples said current source to said second input node; and
        (viii) a sixth switch coupling said second midpoint node to said second reference voltage when said second switch couples said current source to said first input node.

2. The controller of claim 1 further wherein the state of said second switch is controlled by a D flip-flop which is clocked whenever either input node of either capacitor divider exceeds a predetermined threshold voltage.

3. The controller of claim 1 wherein the state of said second switch is controlled by an external oscillator.

4. A controller for a switch-mode power converter comprising:
    (a) a comparator having an output terminal and first and second input terminals;
    (b) a switch-mode power train coupled to said output terminal and operable to receive an unregulated input voltage and to provide a regulated output voltage;
    (c) a feedback network coupled to receive the regulated output voltage of said switch-mode power train and to provide a voltage to the first input of said comparator;
    (d) a ramp circuit comprising:

(i) a first input node, a first midpoint node, a first reference voltage node and a first capacitor divider circuit comprising a first capacitor connected from said first input node to said first midpoint node and a second capacitor connected from said first midpoint node to said first reference voltage node; and (ii) a second input node, a second midpoint node and a second capacitor divider comprising a third capacitor connected from said second input node to said second midpoint node and a fourth capacitor connected from said second midpoint node to said first reference node, (iii) a first switch selectively coupling one of said first midpoint node or said second midpoint node to said second input of said comparator; and (iv) a feedback circuit from said switch-mode power train to said first midpoint node including a fifth capacitor and to said second midpoint node including a sixth capacitor.

5. The controller of claim 4 wherein said feedback circuit provides a voltage proportional to a time average of said regulated output voltage provided by the switch-mode power train.

6. The controller of claim 4 wherein said feedback circuit provides a voltage proportional to the instantaneous current passing through an element of said switch mode power train.

7. The controller of claim 4 wherein said feedback circuit provides a voltage proportional to a time average of the instantaneous current passing through an element of the switch-mode power train.

8. A method of controlling a switch-mode power converter comprising:

(a) providing a comparator having an output terminal and first and second input terminals;

(b) providing a switch-mode power train coupled to said output terminal and operable to receive an unregulated input voltage and to provide a regulated output voltage;

(c) coupling a feedback network to receive the regulated output voltage of said switch-mode power train and to provide a voltage to the first input of said comparator;

(d) providing a ramp circuit comprising:

(i) a first input node, a first midpoint node, a first reference voltage node and a first capacitor divider circuit comprising a first capacitor connected from said first input node to said first midpoint node and a second capacitor connected from said first midpoint node to said first reference voltage node; and (ii) a second input node a second midpoint node and a second capacitor divider comprising a third capacitor connected from said second input node to said second midpoint node and a fourth capacitor connected from said second midpoint node to said first reference voltage node;

(e) providing a first switch selectively coupling one of said first midpoint node or said second midpoint node to said second input of said comparator; and (f) providing a feedback circuit from said switch-mode power train to said first midpoint node including a fifth capacitor and to said second midpoint node including a sixth capacitor.

9. The method of claim 8 wherein said feedback circuit provides a voltage proportional to the instantaneous current passing through an element of said switch mode power train.

10. The method of claim 8 wherein said feedback circuit provides a voltage proportional to a time average of the instantaneous current passing through an element of the switch-mode power train.

11. The method of claim 8 wherein said feedback circuit provides a voltage proportional to a time average of said regulated output voltage provided by the switch-mode power train.

12. A method of controlling a switch-mode power converter comprising:

(a) providing a comparator having an output terminal and first and second input terminals;

(b) providing a switch-mode power train coupled to said output terminal and operable to receive an unregulated input voltage and to provide a regulated output voltage;

(c) coupling a feedback network to receive the regulated output voltage of said switch-mode power train and to provide a voltage to the first input of said comparator;

(d) providing a ramp circuit comprising:

(i) a first input node, a first midpoint node and a first capacitor divider circuit comprising a first capacitor connected from said first input node to said first midpoint node and a second capacitor connected from said first midpoint node to a first reference voltage;

(ii) a second input node, a second midpoint node and a second capacitor divider comprising a third capacitor connected from said second input node to said second midpoint node and a fourth capacitor connected from said second midpoint node to said first reference voltage;

(iii) providing a first switch selectively coupling one of said first midpoint node or said second midpoint node to said second input of said comparator;

(iv) providing a second switch coupling a current source to said first input node of said first capacitor divider when said first switch connects said first midpoint node to said second input of said comparator and coupling said current source to said second input node when said first switch connects said second midpoint node to said second input of said comparator;

(v) providing a third switch coupling said first input node to a first reference voltage when said second switch couples said current source to said second input node;

(vi) providing a fourth switch coupling said second input node to said first reference voltage when said second switch couples said current source to said first input node;

(vii) providing a fifth switch coupling said first midpoint node to a second reference voltage node when said second switch couples said current source to said second input node; and (viii) providing a sixth switch coupling said second midpoint node to said second reference voltage node when said second switch couples said current source to said first input node.

13. The method of claim 12 further including controlling the state of said second switch by an external oscillator.

14. The method of claim 12 further including controlling the state of said second switch by a D flip-flop which is clocked whenever either input node of either capacitor divider exceeds a predetermined threshold voltage.

* * * * *